United States Patent
Zhao et al.

(10) Patent No.: US 11,281,384 B2
(45) Date of Patent: Mar. 22, 2022

(54) METHOD, DEVICE AND COMPUTER PROGRAM PRODUCT FOR MANAGING MEMORY OF DEDICATED PROCESSING RESOURCE

(71) Applicant: EMC IP Holding Company LLC, Hopkinton, MA (US)

(72) Inventors: Junping Zhao, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/396,057

(22) Filed: Apr. 26, 2019

(65) Prior Publication Data

US 2020/0233593 A1 Jul. 23, 2020

(30) Foreign Application Priority Data

Jan. 21, 2019 (CN) .......................... 201910053486.8

(51) Int. Cl.
*G06F 3/06* (2006.01)
*G06F 13/28* (2006.01)
*G06F 9/50* (2006.01)

(52) U.S. Cl.
CPC ............ *G06F 3/0631* (2013.01); *G06F 3/067* (2013.01); *G06F 3/0607* (2013.01);
(Continued)

(58) Field of Classification Search
None
See application file for complete search history.

(56) References Cited

U.S. PATENT DOCUMENTS

2014/0310241 A1* 10/2014 Goyen .................. G06F 16/178
707/634
2017/0060736 A1* 3/2017 Lin ......................... G06F 9/5016
(Continued)

OTHER PUBLICATIONS nvidia.com, "NVLink Fabric Multi-GPU Processing / NVIDIA Data Center," https://www.nvidia.com/en-us/data-center/nvlink/, downloaded Apr. 25, 2019, 2 pages.
(Continued)

*Primary Examiner* — Tuan V Thai
*Assistant Examiner* — Alexander J Yoon
(74) *Attorney, Agent, or Firm* — Ryan, Mason & Lewis, LLP (57) ABSTRACT

A method comprises determining, in a process of storing data for a computing task of a first dedicated processing resource of a set of dedicated processing resources to the first dedicated processing resource, a size of an available space of a memory of the first dedicated processing resource; in response to the size of the available space of the memory of the first dedicated processing resource being lower than a predetermined threshold value, determining a second dedicated processing resource of the set of dedicated processing resources, a size of an available space of a memory of the second dedicated processing resource is greater than the predetermined threshold value; and causing at least one portion of the data not stored on the memory of the first dedicated processing resource to be stored on the memory of the second dedicated processing resource.

20 Claims, 7 Drawing Sheets

(52) U.S. Cl.
CPC .......... *G06F 3/0653* (2013.01); *G06F 9/5016* (2013.01); *G06F 13/28* (2013.01); *G06F 2213/0026* (2013.01)

(56) References Cited

U.S. PATENT DOCUMENTS

| | | | |
|---|---|---|---|
| 2017/0147227 A1* | 5/2017 | Stabrawa | G06F 3/0607 |
| 2018/0191826 A1* | 7/2018 | Das | G06F 3/0631 |
| 2018/0356992 A1* | 12/2018 | Lamberts | G06F 3/0685 |

OTHER PUBLICATIONS developer.nvidia.com, "NVIDIA Collective Communications Library (NCCL)," https://developer.nvidia.com/nccl, May 10, 2017, 3 pages.
devblogs.nvidia.com, "Unified Memory in CUDA 6," https://devblogs.nvidia.com/unified-memory-in-cuda-6/, Nov. 18, 2013, 8 pages.
J. Hubbard et al., "GPUs: HMM: Heterogeneous Memory Management," https://www.redhat.com/files/summit/session-assets/2017/S104078-hubbard.pdf, May 4, 2017, 26 pages.

\* cited by examiner

METHOD, DEVICE AND COMPUTER PROGRAM PRODUCT FOR MANAGING MEMORY OF DEDICATED PROCESSING RESOURCE

RELATED APPLICATION(S)

The present application claims priority to Chinese Patent Application No. 201910053486.8, filed Jan. 21, 2019, and entitled "Method, Device and Computer Program Product for Managing Memory of Dedicated Processing Resource," which is incorporated by reference herein in its entirety.

FIELD

Embodiments of the present disclosure generally relate to a computer system comprising dedicated processing resources, and more specifically, to a method, device and computer program product for managing a memory of a dedicated processing resource.

BACKGROUND

As computer technology develops, types of dedicated processing resources become increasingly richer and are not limited to the traditional general processing resources such as a Central Processing Unit. For example, the computing ability of a Graphic Processing Unit (GPU) is getting stronger now. Due to its special nature, a GPU is particularly suitable for processing a plurality of types of computing tasks, such as Machine Learning, Deep Learning, Data Mining and High Performance Computing.

Currently, multi-GPU servers are widely arranged according to the requirement of customers. However, a specific GPU device can only use a GPU memory of itself, which limits flexible GPU storage resource management. Moreover, it is unable to perform large-scale Machine Learning model training due to a limited space of a memory on a single GPU device.

SUMMARY

Embodiments of the present disclosure provide a method, device and computer program product of managing memory of a dedicated processing resource.

In accordance with a first aspect of the present disclosure, a method for managing a memory of a dedicated processing resource comprises: determining, in a process of storing data for a computing task of a first dedicated processing resource of a set of dedicated processing resources to the first dedicated processing resource, a size of an available space of a memory of the first dedicated processing resource; in response to the size of the available space of the memory of the first dedicated processing resource being lower than a predetermined threshold value, determining a second dedicated processing resource of the set of dedicated processing resources, a size of an available space of a memory of the second dedicated processing resource is greater than the predetermined threshold value; and causing at least one portion of the data not stored on the memory of the first dedicated processing resource to be stored on the memory of the second dedicated processing resource.

In accordance with a second aspect of the present disclosure, a device for managing a memory of a dedicated processing resource comprises: at least one processing unit; at least one memory, the at least one memory being coupled to the at least one processing unit and storing instructions executed by the at least one processing unit, the instructions, when executed by the at least one processing unit, cause the device to perform acts comprising: determining, in a process of storing data for a computing task of a first dedicated processing resource of a set of dedicated processing resources to the first dedicated processing resource, a size of an available space of a memory of the first dedicated processing resource; in response to the size of the available space of the memory of the first dedicated processing resource being lower than a predetermined threshold value, determining a second dedicated processing resource of the set of dedicated processing resources, a size of an available space of a memory of the second dedicated processing resource is greater than the predetermined threshold value; and causing at least one portion of the data not stored on the memory of the first dedicated processing resource to be stored on the memory of the second dedicated processing resource.

In accordance with a third aspect of the present disclosure, a computer program product is provided. The computer program product is tangibly stored on a non-transient computer-readable medium and comprises machine-executable instructions which, when executed, cause a machine to perform any steps of the method of the first aspect of the present disclosure.

The Summary is intended to introduce a selected concept in a simplified manner, which will be further described in the following detailed embodiments. The Summary is not intended to identify key features or essential features of the present disclosure, or to limit the scope of the disclosure.

BRIEF DESCRIPTION OF THE DRAWINGS

Through the more detailed descriptions of exemplary embodiments of the present disclosure with reference to the accompanying drawings, the above and other objectives, features, and advantages of the present disclosure will become more apparent, wherein the same or corresponding reference numerals represent the same or corresponding components.

DETAILED DESCRIPTION

Hereinafter, the preferred embodiments of the present disclosure will be described in more detail with reference to the accompanying drawings. Although the preferred embodiments of the present disclosure are illustrated in the drawings, it should be understood that the present disclosure may be implemented in various manners, not limited by the embodiments illustrated here. On the contrary, these embodiments are provided to make the present disclosure more thorough and complete and to enable the scope of the present disclosure to be completely conveyed to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one another embodiment." The terms "first" and "second" represent a different or the same object. The following text also can comprise other explicit and implicit definitions.

A dedicated processing resource can be provided in a local client or provided by a remote machine or system. In some embodiments, a computing system based on Cloud can be arranged, which comprises a plurality of servers with one or more dedicated processing resources. The dedicated processing resources of the computer system can be used by different clients according to an actual requirement to schedule respective applications to available dedicated processing resources for operation.

Figure 1:
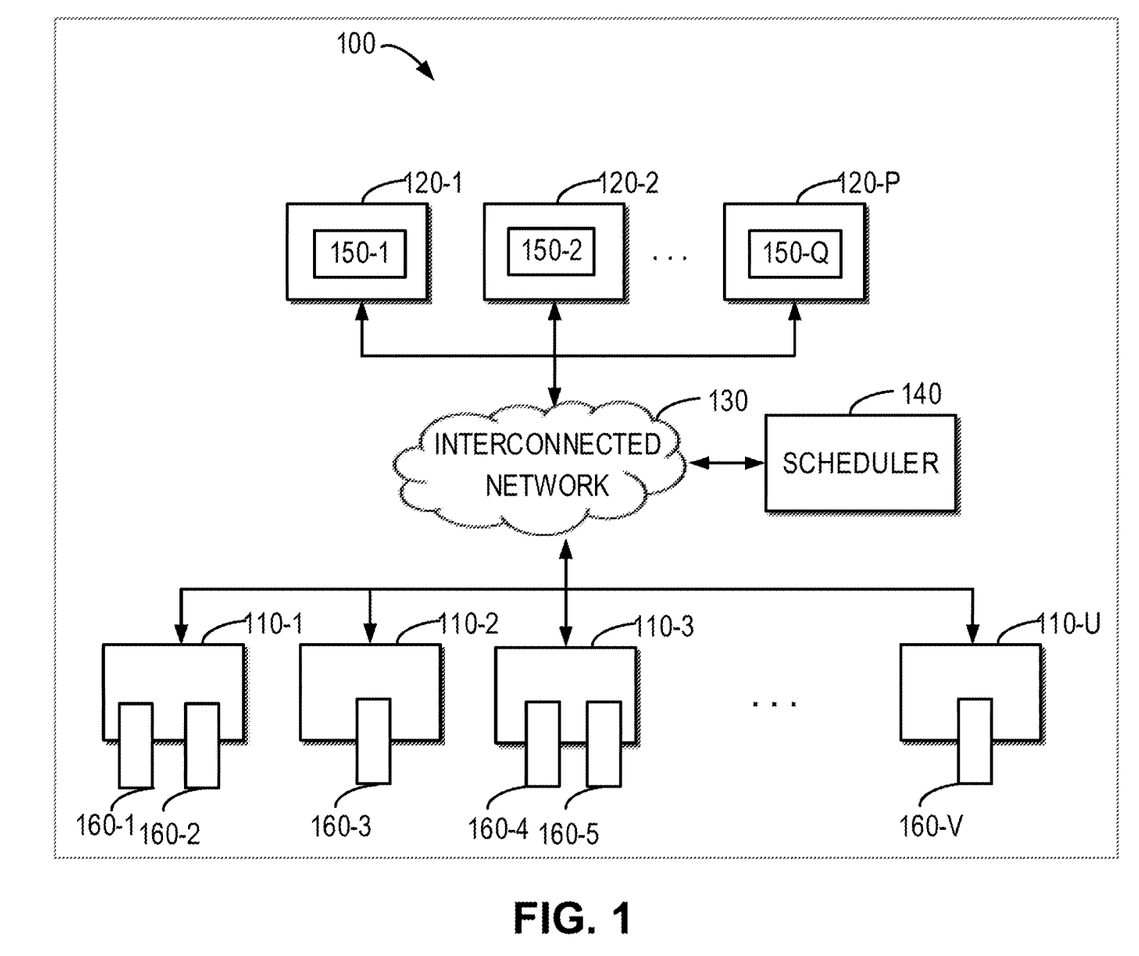
FIG. 1 illustrates a block diagram of an exemplary computer system adapted for implementing embodiments of the present disclosure.

FIG. 1 illustrates a block diagram of a computing system 100 wherein an embodiment of the present disclosure can be implemented. A plurality of servers are arranged in the computing system for application operation, comprising a server 110-1, a server 110-2, a server 110-3, . . . , and a server 110-U (hereinafter collectively or separately referred to servers 110, wherein U is a natural number greater than 1). The computing system 100 also includes a dedicated processing resource 160-1, a dedicated processing resource 160-2, a dedicated processing resource 160-3, a dedicated processing resource 160-4, a dedicated processing resource 160-5, . . . , and a dedicated processing resource 160-V (Hereinafter referred to collectively or separately as dedicated processing resources 160, wherein V is a natural number greater than 1). There may be one or more dedicated processing resources 160 on each server 110.

In the embodiment of FIG. 1, the server 110-1 has the dedicated processing resources 160-1 and 160-2, the server 110-2 has the dedicated processing resource 160-3, and the server 110-U has the dedicated processing resource 160-V. It will be understood that each server is not limited to have only one or two dedicated processing resources, but one server may have one or more dedicated processing resources. Thus, the values of U and V here may be unequal. An example of a dedicated processing resource 160 may include, but is not limited to, a Graphics Processing Unit (GPU), a Field Programmable Gate Arrays (FPGA), and the like. For ease of discussion, some implementations will be described with a GPU as an example of a dedicated processing resource. In addition to the dedicated processing resources 160, the servers 110 may also include one or more general processing resources (not shown), such as a Central Processing Unit (CPU). FIG. 1 further shows a plurality of clients 120-1, 120-2, . . . , and 120-P, etc. (hereinafter collectively or separately referred to clients 120, wherein P is a natural number greater than 1) having to-be-run applications 150-1, 150-2, . . . , and 150-Q (hereinafter collectively or separately referred to applications 150, wherein Q is a natural number greater than 1), respectively. Applications 150 can be any applications that can be run on a machine and can be designed to perform tasks such as respective data processing or analysis. As an example, applications 150 can perform data processing or analysis tasks related to high performance computing (HPC), machine learning (ML) or deep learning (DL), and artificial intelligence (AI). It will be understood that each client is not limited to having only one application, but one client may have one or more applications. Thus, the values of P and Q here may be unequal.

In order to run these applications quickly and efficiently and/or to preserve local dedicated processing resources, clients 120 may request dedicated processing resources 160 of servers 110 to run these applications 150. In such an implementation, clients 120 can be connected to one or more servers 110 through interconnected network 130 and deliver the applications 150 to one or more dedicated processing resources 160 of servers 110 for running. Depending on interfaces supported by clients 120, servers 110 and/or dedicated processing resources 160, the interconnected network 130 may support different types of wired or wireless connections based on various network transmission technologies, such as Remote Direct Memory Access (RDMA) and Transmission Control Protocol (TCP).

It should be understood that the illustration of devices and/or arrangement illustrated in FIG. 1 is only one example. In other examples, the computing system 100 can include any suitable number of servers 110 and clients 120. Each server 110 can be mounted with any suitable number of dedicated processing resources 160, and each client 120 can have a plurality of applications 150 to run. Moreover, although shown separately, the scheduler 140 may be implemented by other devices independent of the servers 110 in practical applications, or may be implemented partially or fully on one or more servers 110.

For clarity and conciseness, an example implementation of the present disclosure will be described in detail below with a GPU core as an example. As known, a GPU is a dedicated processor whose powerful computing ability is derived from its large number of cores and high bandwidth memory. In GPU hardware architecture, one GPU typically has a large number of GPU cores, such as 5120 or nearly 10,000 cores. As a dedicated processing resource, the GPU core is a most basic processing unit, also known as a Stream Processor (SP). Instructions and tasks are ultimately processed on the GPU core. A plurality of GPU cores execute instructions simultaneously, thereby implementing parallel computing of the GPU. Combined with some other resources, such as registers or shared memories, a plurality of SPs can form a stream multiprocessor (SM).

However, it should be understood that the GPU is merely an exemplary dedicated processing resource and is not intended to limit the scope of the disclosure. The spirit and principles described herein can be applied to other dedicated processing resources, such as a dedicated processing resource in an accelerator such as a Field Programmable Gate Array (FPGA), whether currently known or would be developed in the future, and not only limited to GPU cores.

There are some unresolved challenges in current computing systems. For large-scale deep learning or inference models, a single dedicated processing resource may suffer from out of memory (OOM) panic. To avoid model training failures, users may need to reduce the training batch size, adjust the model structure, or convert the model to parallel. In this case, the user may also need to upgrade the hardware, which will result in greater costs.

Moreover, the servers 110 may have a plurality of dedicated processing resources 160. However, each dedicated processing resource is currently used in a manner separate from each other. Currently, there is no effective solution for aggregating storage resources of a plurality of dedicated processing resources, or balancing storage load across a plurality of dedicated processing resources.

Based on deficiencies in the current technology, the present disclosure proposes a method for managing a memory of a dedicated processing resource. In this approach, storage space can be allocated for computing tasks across a plurality of memories of dedicated processing resources. This is achieved by a manner of minimizing the impact on current applications or models, and fully considering topology structures of the dedicated processing resources to optimize the performance of the memory for accessing remote dedicated processing resources.

Figure 2:
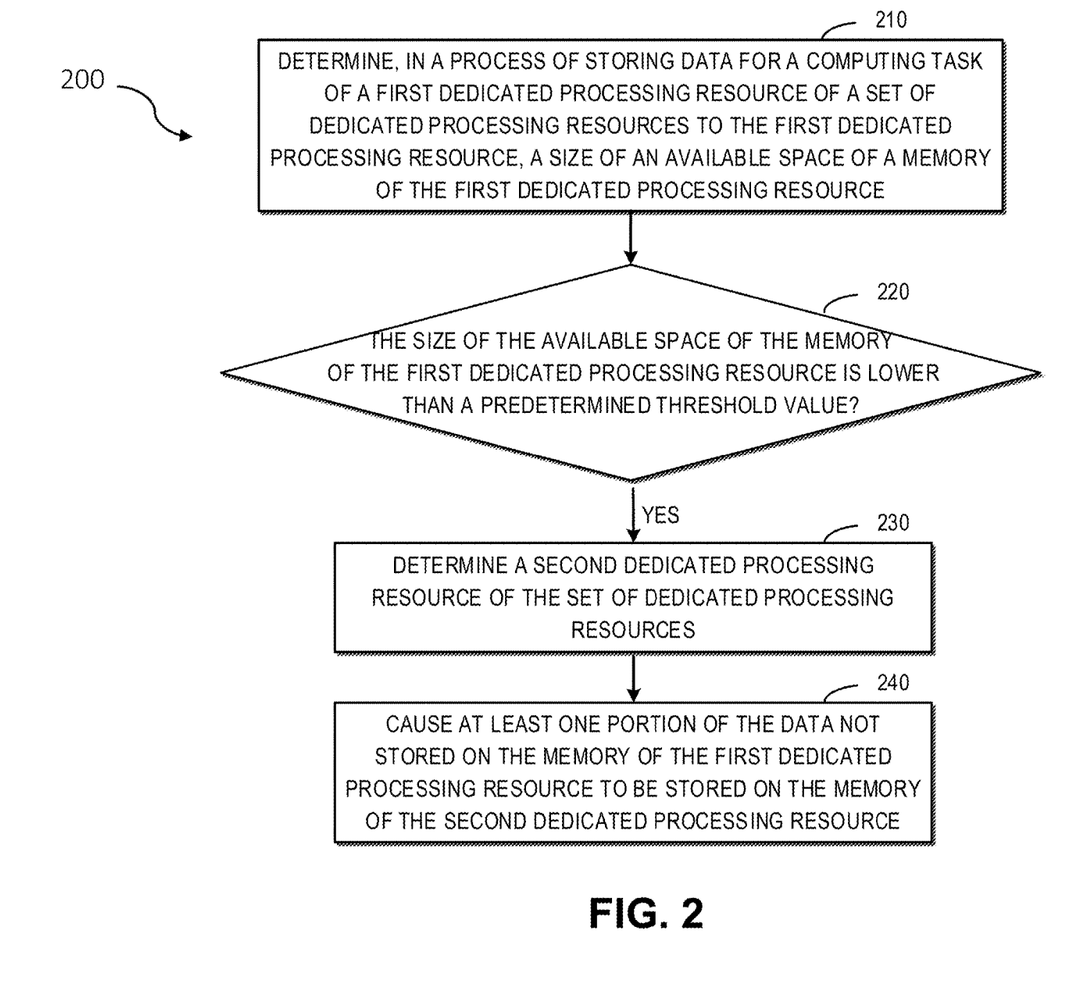
FIG. 2 illustrates a flow diagram of a method according to embodiments of the present disclosure.

In accordance with some embodiments of the present disclosure, a method for managing a memory of the dedicated processing resource 160 is provided. FIG. 2 schematically illustrates a flow diagram of a method 200 for managing the memory of the dedicated processing resource 160 in accordance with some embodiments of the present disclosure. It should be understood that the method 200 may also include additional acts not shown and/or may omit the shown acts, and the scope of the present disclosure is not limited in this respect.

The acts involved in the method 200 are described below in conjunction with FIG. 1. For example, the method 200 can be performed by the servers 110 as shown in FIG. 1, for example take the server 110-1 as an example. It should be understood that the method 200 can also be performed by other servers 110-2, 110-3, . . . , and 110-U shown in FIG. 1. More specifically, the server 110-1 may provide management components to perform the method 200 over a driver program of the dedicated processing resource 160.

As shown in FIG. 2, at block 210, the server 110-1 determines, in a process of storing data for a computing task of a first dedicated processing resource of a set of dedicated processing resources to the first dedicated processing resource 160-1 included in the server 110-1, a size of an available space of a memory of the first dedicated processing resource 160-1.

In some embodiments, the server 110-1 may include a monitor for tracking a size of an available space of a memory of each GPU, such as stored in a key value table <GPU #: freeGPUMemSize>. The monitor is a long-running component in some embodiments.

At block 220, the server 110-1 determines whether the size of the available space of the memory of the first dedicated processing resource 160-1 (e.g., a value of freeGPUMemSize) is lower than a predetermined threshold. If the size of the available space of the memory of the first dedicated processing resource 160-1 is lower than the predetermined threshold, the method 200 proceeds to block 230, where the server 110-1 determines a second dedicated processing resource 160-2 of the set of dedicated processing resources and determines whether the size of the available space of the memory of the second dedicated processing resource is greater than the predetermined threshold. Here, the second dedicated processing resource may include a General Processing Resource such as a CPU.

In some embodiments, server 110-1 determines a data transmission rate corresponding to a connection between the first dedicated processing resource 160-1 and other dedicated processing resources in the set of dedicated processing resources. Then, the server 110-1 determines a group of candidate dedicated processing resources from the set of dedicated processing resources, and the data transmission rate corresponding to a candidate dedicated processing resource of the set of candidate dedicated processing resources is greater than a predetermined threshold rate. For this purpose, the server 110-1 may include a topology awareness allocator. Through a way of topology awareness, when a memory is shared across dedicated processing resources, a dedicated processing resource corresponding to a fastest data transmission rate can be selected, and on this basis, a dedicated processing resource with a shortest distance is further selected, thereby obtaining optimized performances.

Figure 3A:
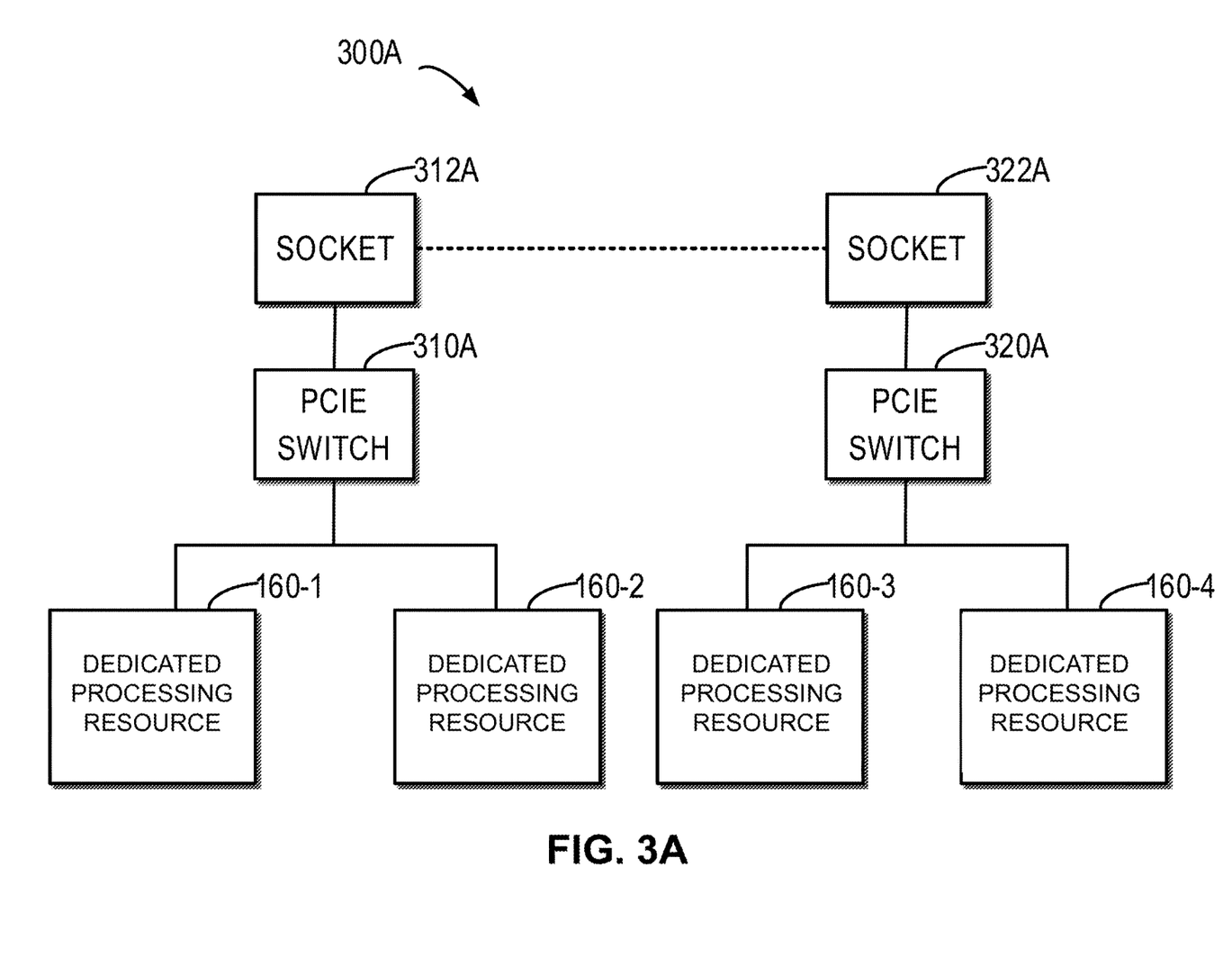
FIG. 3A illustrates a block diagram of a topology structure of a plurality of dedicated processing resources in accordance with embodiments of the present disclosure.

Hereinafter, two typical topology structures will be schematically illustrated with reference to FIGS. 3A and 3B. FIG. 3A schematically illustrates a block diagram 300A of a topology structure of the plurality of dedicated processing resources 160 in accordance with some embodiments of the present disclosure. As shown in FIG. 3A, a PCIe connection is established between the dedicated processing resources 160-1 and 160-2 based on a PCIe switch 310A, and the PCIe connection is established between the dedicated processing resources 160-3 and 160-4 based on the a switch 320A. A Quick Path Interconnection (QPI) connection is established between the PCIe switches 310A and 320A based on SOCKETs 312A and 322A.

Figure 3B:
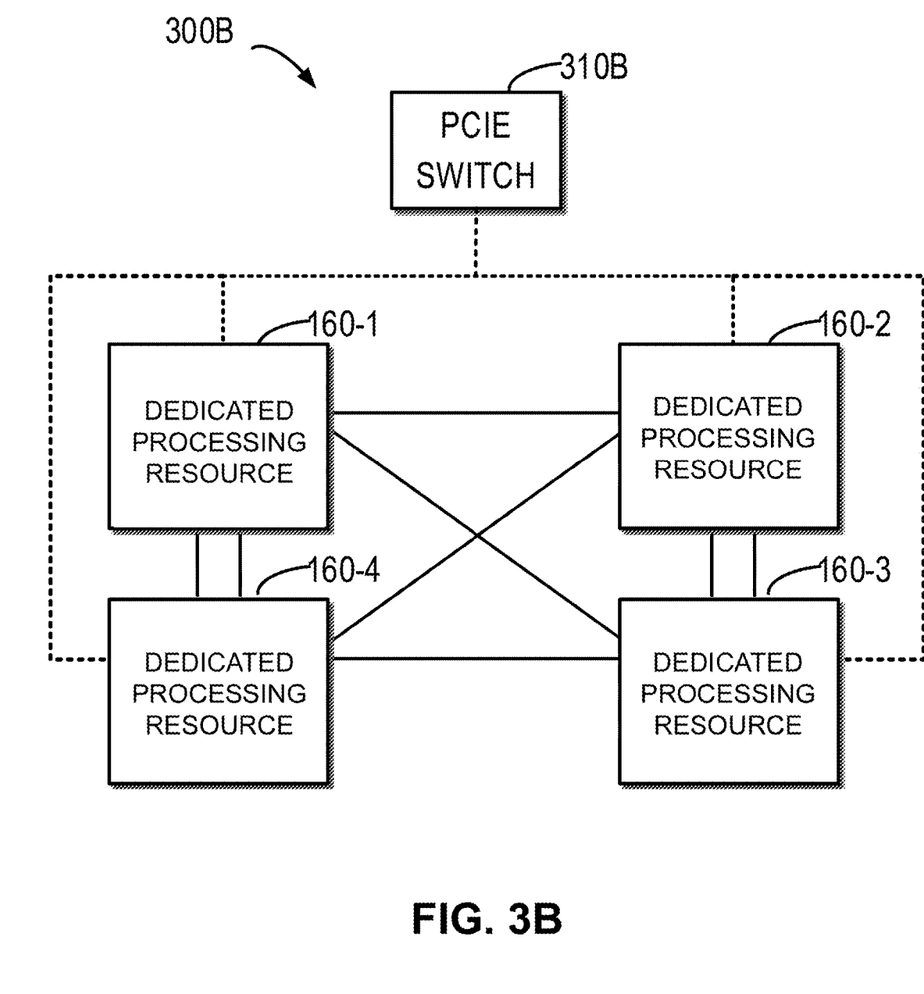
FIG. 3B illustrates a block diagram of another topology structure of a plurality of dedicated processing resources in accordance with embodiments of the present disclosure

FIG. 3B schematically illustrates a block diagram 300B of a topology structure of the plurality of dedicated processing resources in accordance with some embodiments of the present disclosure. As shown in FIG. 3B, taking GPUs of NVIDIA as an example, the dedicated processing resources 160-1, 160-2, 160-3, 160-4 may have NVlink connections as shown by the solid lines, which support a faster data transmission rate. The data transmission rate, for example 72 GB/s, has good scalability. Further, there is also PCIe-based connections established between the plurality of dedicated processing resources 160 via the PCIe switch 310B, as shown by the dashed lines.

In FIG. 3B, a peer-to-peer connection is implemented among the dedicated processing resources 160-1, 160-2, 160-3, and 160-4. In embodiments of the present disclosure, when determining the second dedicated processing resource for the first dedicated processing resource, it is preferably desired to have at least a peer-to-peer connection between the second dedicated processing resource and the first dedicated processing resource.

In this implementation, relevant topology information can be collected from the topology structures as shown in FIGS. 3A and 3B. It will be understood that only two exemplary topology structures are schematically illustrated in FIGS. 3A and 3B. In other application environments, more or fewer dedicated processing resources 160 may be included and other connecting manners may exist between the plurality of dedicated processing resources 160.

Due to the different connecting manners, there is a difference in the data transmission rate between two dedicated processing resources 160. Table 1 schematically illustrates the bandwidth associated with different connections, and the data transmission rate between the two dedicated processing resources 160 may be determined based on the bandwidth in Table 1.

TABLE 1

Examples of connection types

| Serial number | Connection types | Annotation | Bandwidth |
|---|---|---|---|
| 1 | NVLink | Interconnection bus between GPUs. | Best transmission bandwidth, which reaches 36 GB/s. |

TABLE 1-continued

Examples of connection types

| Serial number | Connection types | Annotation | Bandwidth |
|---|---|---|---|
| 2 | PCIe-S (also named as PIX) | Connect two GPUs directly with single PCIe switch. | Preferable transmission bandwidth, which reaches 16 GB/s. |
| 3 | PCIe-M | Connect two GPUs indirectly with a plurality of PCIe switches. | Transmission bandwidth is lower than PCIe-S. |
| 4 | PCIe-H (also named as PHB) | Bridge two GPUs with PCIe main machine. | Transmission bandwidth is lower than PCIe-M. |
| 5 | QPI (also named as SOC) | Connection across SOCKETs | LOWER transmission bandwidth. |
| ... | ... | ... | ... |

In some embodiments, the server 110-1 may determine the data transmission rate corresponding to connections between each dedicated processing resource 160, based on the topology structures between each dedicated processing resource 160 and according to the connection types shown in Table 1. In order to obtain better performances, the server 110-1 may first try to find a dedicated processing resource whose data transmission rate of the connection with the first dedicated processing resource 160-1 is greater than a threshold rate, and further find an adjacent dedicated processing resource with a shortest distance to the first dedicated processing resource 160-1.

In some embodiments, the server 110-1 may group each dedicated processing resource 160 to a hierarchical tree based on their connections according to the queried topology structure. When determining the second dedicated processing resource, the server 110-1 first searches for such a hierarchical tree from a lowest level and may continue to search upward, until a predetermined stopping criterion is met (e.g., storage resource allocation is performed without across the QPI).

With continued reference to FIG. 2, at block 240, the server 110-1 causes at least one portion of the data not stored on the memory of the first dedicated processing resource 160-1 to be stored on the memory of the second dedicated processing resource 160-2. In some embodiments, the server 110-1 may obtain physical addresses of a pre-allocated space of the memory of the second dedicated processing resource and causes at least one portion of the data to be stored based on the physical addresses.

In order to optimize performances, for example, to reduce the space occupied by metadata, and to avoid frequent memory allocation and driver program calls, the server 110-1 may pre-allocate storage space of the memory of each GPU and split the storage space into pieces. The size of the block is, for example, 1 MB, 8 MB, 64 MB, 512 MB or 1 GB, and the like. The pre-allocated storage space is organized as virtual storage in the form of a storage resource pool, therefore applications can obtain a "virtual" GPU memory pointer (VGPtr), which can be mapped to the basic physical GPU memory pointer (PGPtr), which can be configured from a single or a plurality of GPU devices.

In some implementations, a self-maintaining mapping table shown in Table 2 can be used to map VGPtr addresses (including offsets and sizes) to an underlying PGPtr (including GPU indexes and addresses). The mapping table can be updated in real time or periodically, can be implemented as a tree structure for quick query, and can be accelerated by special hardware (such as TLB). In addition, the implementation of the virtual memory pointer can also be based on current GPU memory application interfaces, such as Nvidia UVA or Linux HMM.

TABLE 2

Mapping table between virtual addresses and physical addresses

| VGPtr Information | Size | GPU Index | GPU Physical Address | |
|---|---|---|---|---|
| 0x100000 | 1048576 | GPU0 | 0xF00000 | ... |
| 0x200000 | 2097152 | GPU1 | 0xE00000 | ... |
| ... | ... | ... | ... | ... |

When the application requests a GPU memory allocation, the server 110-1 typically returns the virtual GPU memory pointer (VGPtr) back to the application, wherein the entire or partial underlying memory may come from a local or neighbor GPU. Alternatively, the configuration of the underlying memory can change over time, for example for rebalancing. Providing a virtual memory pointer causes the application underlying layer to remain unchanged, even if the configuration of the underlying memory changes, so to minimize the impact of the underlying storage resource on the application layer.

From the above description, it can be seen that according to the technical solution of this disclosure, the memory of a plurality of dedicated processing can be flexibly managed. The technical solution effectively aggregates storage resources of the plurality of dedicated processing resources such that the training of large-scale models can be carried out successfully. The technical solution takes full account of the topology structure of each dedicated processing resource and the corresponding data transfer rate, in order to reduce waiting time, so as to achieve better performance. In addition, the technical solution minimizes the impact of the underlying memory on the application layer by providing a single virtual memory pointer.

Figure 4A:
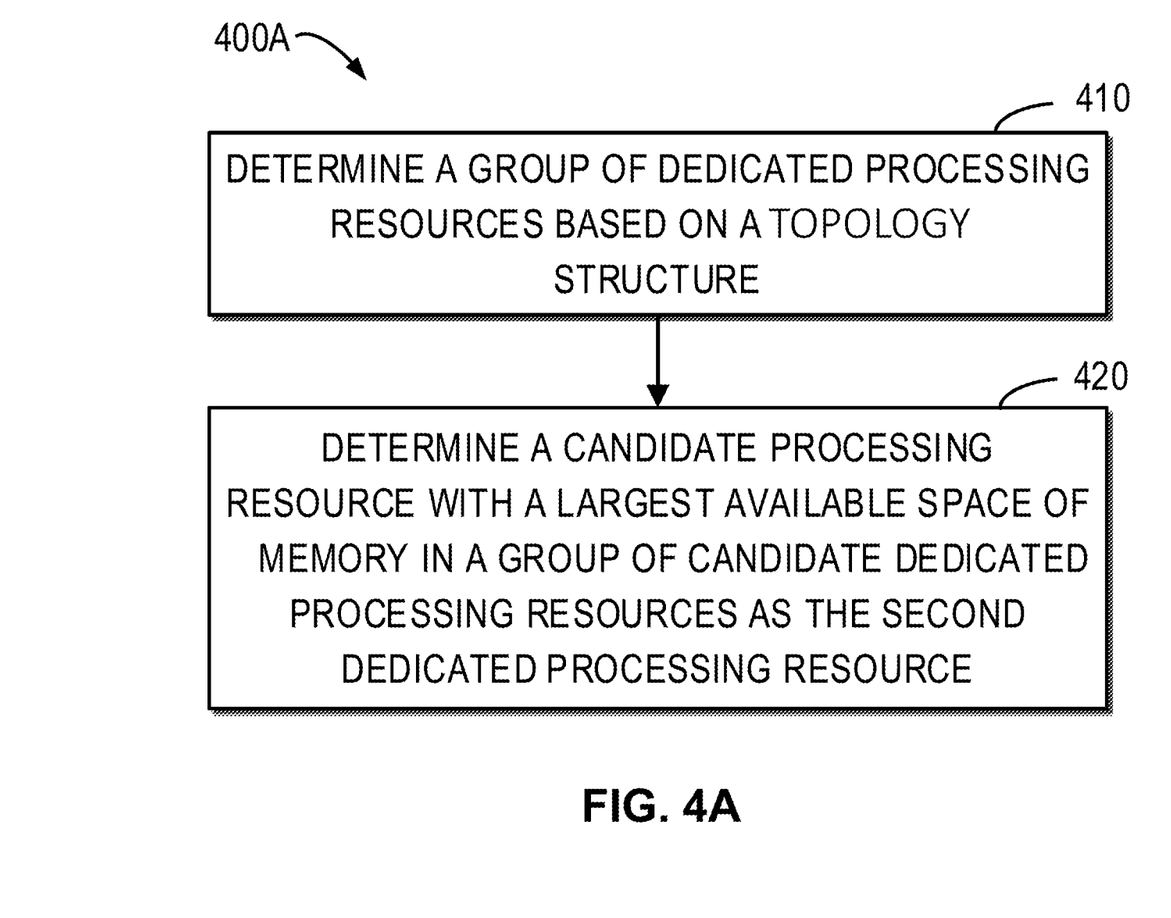
FIG. 4A illustrates a flow diagram of another method according to embodiments of the present disclosure.
Figure 4B:
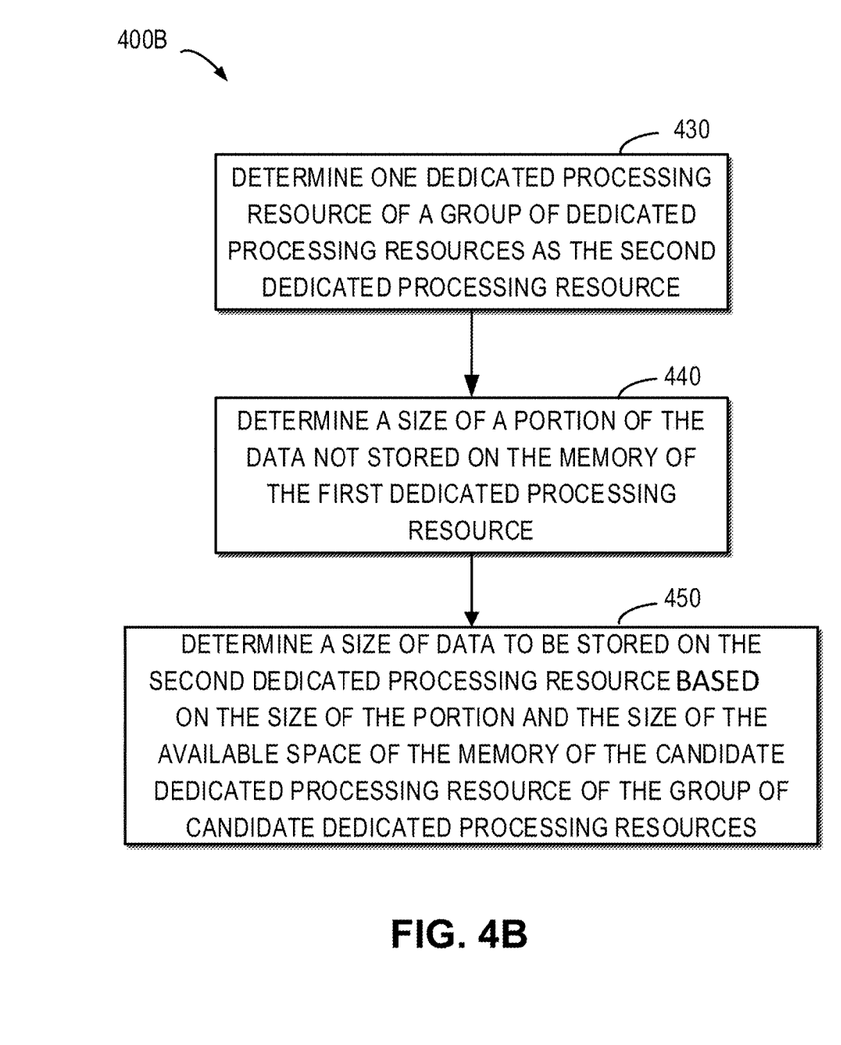
FIG. 4B illustrates a flow diagram of a further method according to embodiments of the present disclosure.

In addition, there may be various implementations for determining the second dedicated processing resource. FIGS. 4A and 4B illustrate flow diagrams of methods 400A and 400B in accordance with embodiments of the present disclosure, respectively. It should be understood that the methods 400A and 400B may also include additional acts not shown and/or may omit the illustrated acts, and the scope of the present disclosure is not limited in this aspect.

For method 400A, at block 410, as previously described, the server 110-1 determines the group of candidate dedicated processing resources based on the topology structure. Next, the server 110-1 determines the second dedicated processing resource from the group of candidate dedicated processing resources based on the size of the available space of the memory of the candidate dedicated processing resource of the group of candidate dedicated processing resources. Thus, comprehensive memory management can be implemented across a plurality of dedicated processing resources.

The policy of determining the second dedicated processing resource based on the size of the available space of the memory may include a resource compact type and a load balancing type, the policy may be set by the user through configuration parameters. In a case of the resource compact type, it is desired that data will be shared between as few dedicated processing resources as possible to achieve faster data access speeds. The method 400A proceeds to block 420, the server 110-1 determines a candidate processing resource with a largest available memory space of the group of candidate dedicated processing resources as the second dedicated processing resource.

Method 400B can be used for load balancing type, wherein the usage ratio of a memory of each dedicated processing resource is desired to be similar to optimize overall performance. At block 430, the server 110-1 determines one candidate dedicated processing resource of the group of candidate dedicated processing resources as the second dedicated processing resource. Block 430 may be performed after block 410.

The method 400B proceeds to block 440 where the server 110-1 determines the size of the portion of the data that is not stored on the memory of the first dedicated processing resource. Method 400B then proceeds to block 450 where the server 110-1 determines the size of data to be stored on the second dedicated processing resource based on the size of the portion and the size of the available space of the memory of the candidate dedicated processing resource of the group of candidate dedicated processing resources.

In other words, in the case of the load balancing type, the portion of the data that is not stored on the memory of the first dedicated processing resource is stored on the plurality of candidate dedicated processing resources. In order to balance the load of the memory of the plurality of candidate dedicated processing resources, the size of the data stored on the candidate dedicated processing resource is directly proportional to the size of the available space of the memory of the candidate dedicated processing resource.

Additionally or alternatively, after determining the candidate dedicated processing resource, the server 110-1 may determine the second dedicated processing resource from the group of candidate dedicated processing resources based on a historical selection, that is, the previously selected second dedicated processing resource is used as a dedicated processing resource to which the current data is to be stored to achieve better locality.

In some embodiments, the server 110-1 may include a policy component for providing configurable parameters to manage the memory of dedicated processing resources more flexibly. For example, the user may choose to enable/disable an automatic dedicated processing resource allocation, or may enable/disable an automatic dedicated processing resource allocation based on conditions. This condition may be that the remote memory is enabled only if the current device does not have an available memory. Users can also set how to search the hierarchical tree structure of a dedicated processing resource, especially the stopping standard.

As another example, the user can select the size and growth strategy of the pre-allocated space of the memory. The size of the pre-allocated space can be 50% of the memory, and if the size of the storage resource pool is only 25% available left, the size of the pre-allocated space is increased by 10%. It should be understood that the above values are examples only rather than limitations.

Figure 5:
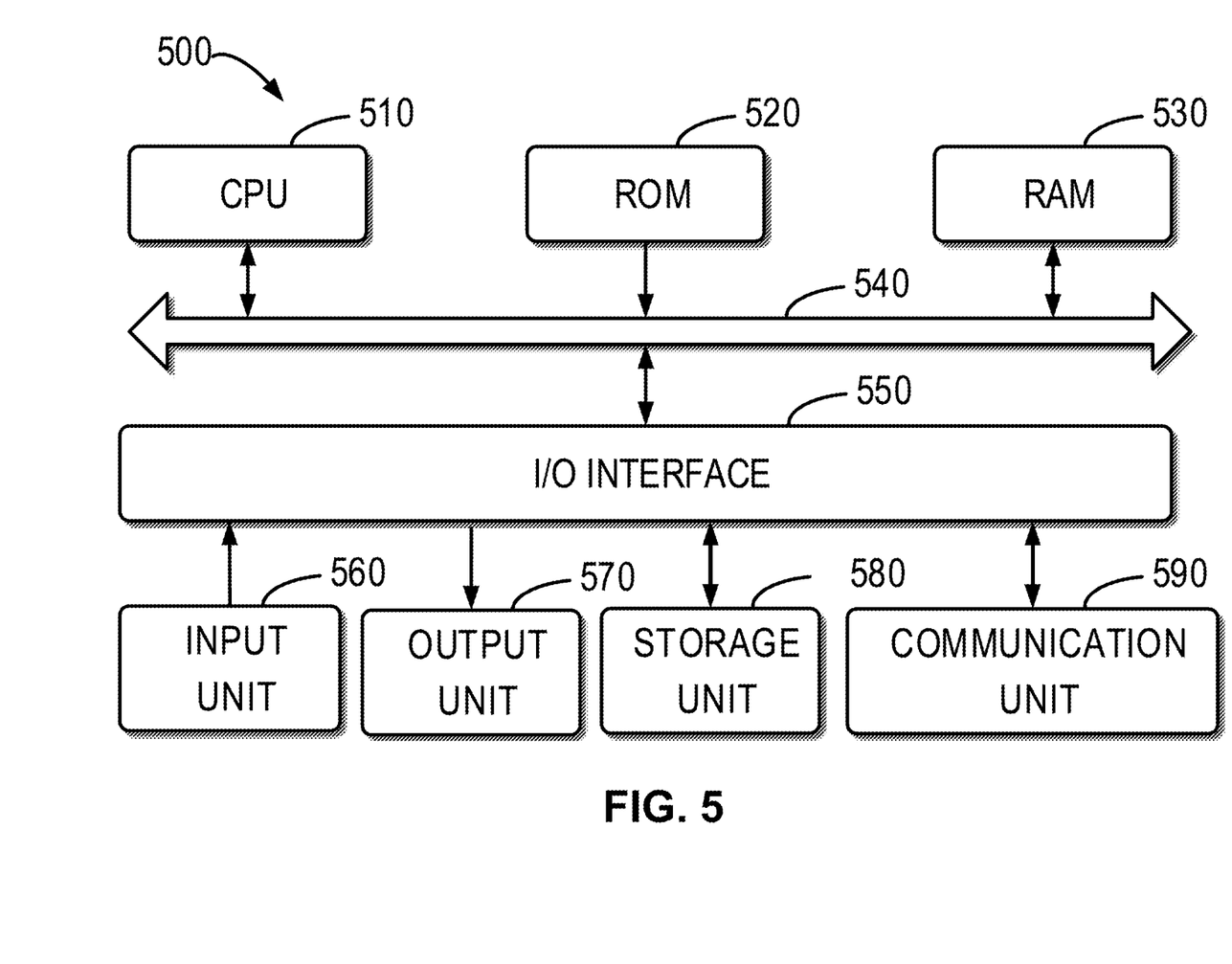
FIG. 5 illustrates a block diagram which can be used to implement an example device of embodiments of the present disclosure.

FIG. 5 shows a schematic block diagram of an example device 500 for implementing embodiments of the present disclosure. As shown, the device 500 includes a Central Processing Unit (CPU) 510, which can perform a variety of appropriate acts and processing based on computer program instructions stored in a read-only memory (ROM) 520 or computer program instructions loaded from a storage unit 580 into a random access memory (RAM) 530. In the RAM 530, various programs and data which the device 500 operations required can be stored. The CPU 510, ROM 520, and RAM 530 are connected to each other over a bus 540. The input/output (I/O) interface 550 is also connected to the bus 540.

A plurality of components in device 500 are connected to the I/O interface 550, including: an input unit 560, such as keyboard, mouse, etc., an output unit 570, such as various types of displays, speakers, etc., a storage unit 580, such as disk, disc, etc., and a communication unit 590, such as a network card, modem, wireless communication transceiver and so on. Communication unit 590 allows the device 500 to exchange information/data with other devices through computer networks such as the Internet and/or various telecommunications networks.

The various processes and methods described above, such as method 200 and methods 400A and 400B, may be performed by a processing unit 510. For example, in some embodiments, method 200, methods 400A and 400B can be implemented as a computer software program that is tangibly embodied in a machine readable medium, such as storage unit 580. In some embodiments, some or the entire computer program can be loaded and/or installed onto the device 500 via the ROM 520 and/or a communication unit 590. When a computer program is loaded into the RAM 530 and executed by the CPU 510, one or more acts of the methods 200, 400A and 400B described above can be performed.

The present disclosure can be a method, device, system, and/or computer program product. The computer program product can include a computer readable storage medium having computer readable program instructions for performing various aspects of the present disclosure.

The computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, Random Access Memory (RAM), Read Only Memory (ROM), Erasable Programmable Read Only Memory (EPROM) or flash memory, Static Random Access Memory (SRAM), portable Compact Disk Read Only Memory (CD-ROM), Digital Versatile Disk (DVD), memory stick, floppy disk, mechanical encoding device, for example, punch card or convex structure in groove stored with instructions thereon, and any suitable combination of the above. A computer readable storage medium as used herein is not to be interpreted as a transient signal itself, such as a radio wave or other freely propagating electromagnetic wave, an electromagnetic wave propagating through a waveguide or other transmission medium (e.g., a light pulse through a fiber optic cable), or the electrical signal through a wire transmitted.

The computer readable program instructions described herein can be downloaded from a computer readable storage medium to various computing/processing devices or downloaded to an external computer or external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer readable program instructions from the network and forwards the computer readable program instructions for storage in a computer readable storage medium in each computing/processing device.

Computer program instructions for performing the operations of the present disclosure may be assembly instructions, Instruction Set Architecture (ISA) instructions, machine instructions, machine related instructions, microcode, firmware instructions, state setting data, or source code or object code written in any combination of one or more programming languages, including object-oriented programming languages such as Java, Smalltalk, C++, etc., as well as conventional procedural programming languages such as C language or similar programming languages. The computer readable program instructions can be execute entirely on the user's computer, partly on the user's computer, as a stand-alone software package, partly on the user's computer, partly on the remote computer, or entirely on the remote computer or server. In the case of a remote computer, the remote computer can be connected to the user's computer through any kind of network, including a Local Area Network (LAN) or Wide Area Network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the present disclosure are described herein with reference to flowchart and/or block diagrams of methods, devices (systems) and computer program products according to embodiments of the present disclosure. It will be understood that each block of the flowchart and/or block diagrams and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by the processing unit of a computer or other programmable data processing apparatus, the device is produced wherein the functions/acts specified in one or more of the flowchart and/or block diagrams are implemented. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more of the block of flowchart and/or block diagrams.

Computer readable program instructions can also be loaded onto a computer, other programmable data processing device, or other device to perform a series of operational steps on a computer, other programmable data processing device or other device to produce a process of computer implementation such that instructions executed on a computer, other programmable data processing apparatus, or other device implement the functions/acts recited in one or more blocks of the flowcharts and/or block.

The flowchart and block diagrams in the drawings illustrate the possibly-implemented architecture, functionality and operation of systems, methods and computer program products according to various embodiments of the present disclosure. In this regard, each block in the flowchart or block diagram can represent a module, a program segment, or a portion of an instruction that includes one or more executable instructions for implementing specified logic function. In some alternative implementations, the functions noted in the blocks may also occur in a different order from those illustrated in the figures. For example, two consecutive blocks may be executed substantially in parallel, and they may sometimes be executed in the reverse order, depending upon the functionality involved. It is also noted that each block of the block diagrams and/or flowcharts, and combinations of blocks in the block diagrams and/or flowcharts, can be implemented in a dedicated hardware-based system that performs the specified function or act or it can be implemented by a combination of dedicated hardware and computer instructions.

Various embodiments of the present disclosure have been described above, and the foregoing description is exemplary rather than exhaustive and is not limited to the disclosed embodiments. Numerous modifications and changes are obvious for those skilled in the art without departing from the scope of the invention. The selection of terms used herein is intended to best explain the principles, practical applications of each embodiment, or technical improvements of the techniques in the market, or, enables the various embodiments disclosed herein understood by other ordinary skilled in the art.

What is claimed is:

1. A method for managing a memory of a dedicated processing resource, comprising:
   determining, in a process of storing data for a learning model computing task of a first dedicated processing resource of a set of dedicated processing resources to the first dedicated processing resource, a size of an available space of a memory of the first dedicated processing resource;
   in response to the size of the available space of the memory of the first dedicated processing resource being lower than a predetermined threshold value, determining a second dedicated processing resource of the set of dedicated processing resources, a size of an available space of a memory of the second dedicated processing resource being greater than the predetermined threshold value; and
   causing at least one portion of the data not stored on the memory of the first dedicated processing resource to be stored on the memory of the second dedicated processing resource;
   wherein determining the second dedicated processing resource of the set of dedicated processing resources is based at least in part on a topology structure and associated data transfer capabilities of the set of dedicated processing resources;
   wherein at least parts of the memories of the first and second dedicated processing resources utilized to store respective portions of the data are organized as a storage resource pool with mapping of virtual memory pointers utilized by one or more applications to respective physical memory pointers into the memories of the first and second dedicated processing resources;
   wherein the topology structure of the set of dedicated processing resources comprises a peer-to-peer network;
   wherein the first and second dedicated processing resources are coupled through a first peer-to-peer connection of the peer-to-peer network that is determined, as part of the determining of the second dedicated processing resource, to have a greater data transmission rate relative to respective data transmission rates of one or more additional peer-to-peer connections of the topology structure comprising the peer-to-peer network;

wherein determining the second dedicated processing resource includes identifying one or more additional dedicated processing resources;

wherein one or more additional portions of the data not stored on the memory of the first dedicated processing resource are stored on one or more memories of the one or more additional dedicated processing resources; and wherein the second dedicated processing resource and the one or more additional dedicated processing resources are further determined based on:

one or more historical selections of the second dedicated processing resource and the one or more additional dedicated processing resources; and sizes of the available spaces of the memories of the second dedicated processing resource and the one or more additional dedicated processing resources.

2. The method of claim 1, wherein determining the second dedicated processing resource comprises:

determining a data transmission rate corresponding to a connection between the first dedicated processing resource and other dedicated processing resources of the set of dedicated processing resources;

determining a group of candidate dedicated processing resources from the set of dedicated processing resources, the data transmission rate corresponding to a candidate dedicated processing resource of the group of candidate dedicated processing resources being greater than a predetermined threshold value rate; and determining the second dedicated processing resource from the group of candidate dedicated processing resources based on a size of an available space of a memory of the candidate dedicated processing resource of the group of candidate dedicated processing resources.

3. The method of claim 2, wherein determining the second dedicated processing resource from the group of candidate dedicated processing resources comprises:

determining a candidate processing resource with a largest available space of a memory in the group of candidate dedicated processing resources as the second dedicated processing resource.

4. The method of claim 2, wherein the second dedicated processing resource is one candidate dedicated processing resource of one group of candidate dedicated processing resources, the method further comprises:

determining a size of a portion of the data not stored on the memory of the first dedicated processing resource; and determining a size of data to be stored on the second dedicated processing resource based on the size of the portion and the size of the available space of the memory of the candidate dedicated processing resource of the group of candidate dedicated processing resources.

5. The method of claim 1, wherein causing the at least one portion of the data to be stored on the memory of the second dedicated processing resource comprises:

obtaining a physical address of a pre-allocated space of the memory of the second dedicated processing resource; and causing the at least one portion of the data to be stored based on the physical address.

6. The method of claim 1, wherein the first dedicated processing resource comprises a dedicated processing unit of a first type and the second dedicated processing resource comprises a dedicated processing unit of a second type different than the first type.

7. The method of claim 6, wherein the dedicated processing unit of the first type comprises a graphics processing unit (GPU).

8. The method of claim 7, wherein the dedicated processing unit of the second type comprises a central processing unit (CPU).

9. A device for managing a memory of dedicated processing resources, comprising:

at least one processing unit;

at least one memory coupled to the at least one processing unit and storing instructions executed by the at least one processing unit, the instructions, when executed by the at least one processing unit, causing the device to perform steps comprising:

determining, in a process of storing data for a computing task of a first dedicated processing resource of a set of dedicated processing resources to the first dedicated processing resource, a size of an available space of a memory of the first dedicated processing resource;

in response to the size of the available space of the memory of the first dedicated processing resource being lower than a predetermined threshold value, determining a second dedicated processing resource of the set of dedicated processing resources, a size of an available space of a memory of the second dedicated processing resource being greater than the predetermined threshold value; and causing at least one portion of the data not stored on the memory of the first dedicated processing resource to be stored on the memory of the second dedicated processing resource;

wherein determining the second dedicated processing resource of the set of dedicated processing resources is based at least in part on a topology structure and associated data transfer capabilities of the set of dedicated processing resources;

wherein at least parts of the memories of the first and second dedicated processing resources utilized to store respective portions of the data are organized as a storage resource pool with mapping of virtual memory pointers utilized by one or more applications to respective physical memory pointers into the memories of the first and second dedicated processing resources;

wherein the topology structure of the set of dedicated processing resources comprises a peer-to-peer network;

wherein the first and second dedicated processing resources are coupled through a first peer-to-peer connection of the peer-to-peer network that is determined, as part of the determining of the second dedicated processing resource, to have a greater data transmission rate relative to respective data transmission rates of one or more additional peer-to-peer connections of the topology structure comprising the peer-to-peer network;

wherein determining the second dedicated processing resource includes identifying one or more additional dedicated processing resources;

wherein one or more additional portions of the data not stored on the memory of the first dedicated processing resource are stored on one or more memories of the one or more additional dedicated processing resources; and wherein the second dedicated processing resource and the one or more additional dedicated processing resources are further determined based on:
one or more historical selections of the second dedicated processing resource and the one or more additional dedicated processing resources; and
sizes of the available spaces of the memories of the second dedicated processing resource and the one or more additional dedicated processing resources.

10. The device of claim 9, wherein determining the second dedicated processing resource comprises:
determining a data transmission rate corresponding to a connection between the first dedicated processing resource and other dedicated processing resource of the set of dedicated processing resources;
determining a group of candidate dedicated processing resources from the set of dedicated processing resources, the data transmission rate corresponding to a candidate dedicated processing resource of the group of candidate dedicated processing resources being greater than a predetermined threshold value rate; and
determining the second dedicated processing resource from the group of candidate dedicated processing resources based on a size of an available space of a memory of the candidate dedicated processing resource of the group of candidate dedicated processing resources.

11. The device of claim 10, wherein determining the second dedicated processing resource from the group of candidate dedicated processing resources comprises:
determining a candidate processing resource with largest available space of a memory in the group of candidate dedicated processing resources as the second dedicated processing resource.

12. The device of claim 10, wherein the second dedicated processing resource is one candidate dedicated processing resource of one group of candidate dedicated processing resources, the method further comprises:
determining a size of a portion of the data not stored on the memory of the first dedicated processing resource; and
determining a size of data to be stored on the second dedicated processing resource based on the size of the portion and the size of the available space of the memory of the candidate dedicated processing resource of the group of candidate dedicated processing resources.

13. The device of claim 9, wherein causing the at least one portion of the data to be stored on the memory of the second dedicated processing resource comprises:
obtaining a physical address of a pre-allocated space of the memory of the second dedicated processing resource; and
causing the at least one portion of the data to be stored based on the physical address.

14. The device of claim 9, wherein the first dedicated processing resource comprises a dedicated processing unit of a first type and the second dedicated processing resource comprises a dedicated processing unit of a second type different than the first type.

15. A computer program product tangibly stored on a non-transient computer-readable medium and comprising machine-executable instructions which, when executed, cause a machine to perform steps of:
determining, in a process of storing data for a computing task of a first dedicated processing resource of a set of dedicated processing resources to the first dedicated processing resource, a size of an available space of a memory of the first dedicated processing resource;
in response to the size of the available space of the memory of the first dedicated processing resource being lower than a predetermined threshold value, determining a second dedicated processing resource of the set of dedicated processing resources, a size of an available space of a memory of the second dedicated processing resource being greater than the predetermined threshold value; and
causing at least one portion of the data not stored on the memory of the first dedicated processing resource to be stored on the memory of the second dedicated processing resource;
wherein determining the second dedicated processing resource of the set of dedicated processing resources is based at least in part on a topology structure and associated data transfer capabilities of the set of dedicated processing resources;
wherein at least parts of the memories of the first and second dedicated processing resources utilized to store respective portions of the data are organized as a storage resource pool with mapping of virtual memory pointers utilized by one or more applications to respective physical memory pointers into the memories of the first and second dedicated processing resources;
wherein the topology structure of the set of dedicated processing resources comprises a peer-to-peer network;
wherein the first and second dedicated processing resources are coupled through a first peer-to-peer connection of the peer-to-peer network that is determined, as part of the determining of the second dedicated processing resource, to have a greater data transmission rate relative to respective data transmission rates of one or more additional peer-to-peer connections of the topology structure comprising the peer-to-peer network;
wherein determining the second dedicated processing resource includes identifying one or more additional dedicated processing resources;
wherein one or more additional portions of the data not stored on the memory of the first dedicated processing resource are stored on one or more memories of the one or more additional dedicated processing resources; and
wherein the second dedicated processing resource and the one or more additional dedicated processing resources are further determined based on:
one or more historical selections of the second dedicated processing resource and the one or more additional dedicated processing resources; and
sizes of the available spaces of the memories of the second dedicated processing resource and the one or more additional dedicated processing resources.

16. The computer program product of claim 15, wherein determining the second dedicated processing resource comprises:
determining a data transmission rate corresponding to a connection between the first dedicated processing resource and other dedicated processing resources of the set of dedicated processing resources;
determining a group of candidate dedicated processing resources from the set of dedicated processing resources, the data transmission rate corresponding to a candidate dedicated processing resource of the group of candidate dedicated processing resources being greater than a predetermined threshold value rate; and determining the second dedicated processing resource from the group of candidate dedicated processing resources based on a size of an available space of a memory of the candidate dedicated processing resource of the group of candidate dedicated processing resources.

17. The computer program product of claim 16, wherein determining the second dedicated processing resource from the group of candidate dedicated processing resources comprises:
determining a candidate processing resource with a largest available space of a memory in the group of candidate dedicated processing resources as the second dedicated processing resource.

18. The computer program product of claim 16, wherein the second dedicated processing resource is one candidate dedicated processing resource of one group of candidate dedicated processing resources, and wherein the machine-executable instructions, when executed, cause the machine to further perform the steps of:
determining a size of a portion of the data not stored on the memory of the first dedicated processing resource; and
determining a size of data to be stored on the second dedicated processing resource based on the size of the portion and the size of the available space of the memory of the candidate dedicated processing resource of the group of candidate dedicated processing resources.

19. The computer program product of claim 15, wherein causing the at least one portion of the data to be stored on the memory of the second dedicated processing resource comprises:
obtaining a physical address of a pre-allocated space of the memory of the second dedicated processing resource; and
causing the at least one portion of the data to be stored based on the physical address.

20. The computer program product of claim 15, wherein the first dedicated processing resource comprises a dedicated processing unit of a first type and the second dedicated processing resource comprises a dedicated processing unit of a second type different than the first type.

* * * * *